(12) United States Patent
Adams et al.

(10) Patent No.: US 8,400,700 B2
(45) Date of Patent: *Mar. 19, 2013

(54) RISLEY INTEGRATED STEERING MODULE

(75) Inventors: Dennis J. Adams, Stow, OH (US); Alan F. Lindsay, Massillon, OH (US); Brian L. Stamper, Kent, OH (US); Charles T. Knorr, Akron, OH (US); Aaron P. Seibel, Pepper Pike, OH (US); Michael R. Crano, Wadsworth, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/882,248

(22) Filed: Sep. 15, 2010

(65) Prior Publication Data

US 2011/0043880 A1 Feb. 24, 2011

Related U.S. Application Data

(63) Continuation-in-part of application No. 12/491,924, filed on Jun. 25, 2009, now Pat. No. 7,898,712.

(60) Provisional application No. 61/076,175, filed on Jun. 27, 2008.

(51) Int. Cl.
*G02B 26/08* (2006.01)
*G02B 5/04* (2006.01)

(52) U.S. Cl. ............... 359/211.2; 359/211.1; 359/209.1; 359/837

(58) Field of Classification Search ............... 359/209.1, 359/211.1, 211.2, 837
See application file for complete search history.

(56) References Cited

U.S. PATENT DOCUMENTS 7,236,299 B1 * 6/2007 Smith .......................... 359/402
7,336,407 B1 2/2008 Adams et al. ................. 359/211

OTHER PUBLICATIONS

*Risley-Prism Based Compact Laser Beam Steering for IRCM, Laser Communications, and Laser Radar*; Schwarze et al.; Critical Technology, Sep. 2005.
*A New Look at RISLEY Prisms*; Schwarze; Photonics Spectra, Jun. 2006.
*Design of adaptive Fiber Optics Collimator For Free-Space Communication Laser Transceiver*; Beresnev et al.; Target-in-the-Loop: Atmospheric Tracking, Imaging, and Compensation II, Proceedings of SPIE; vol. 5895 (2005).
*Risley Prism Beam Pointer*; Ostaszewski et al; Free-Space Laser Communications VI, Proc. Of SPIE vol. 66304, (2006).
*High-Throughput, Continuous Beam Steering Using Rotating Polarization Gratings*; Oh et al.; IEEE Photonics Technology Letters; Manuscript received Jul. 2009/revised Aug. 2009.
Office Action mailed Sep. 30, 2010 in corresponding U.S. Appl. No. 12/491,924.

* cited by examiner

*Primary Examiner* — David N Spector
(74) *Attorney, Agent, or Firm* — Renner Kenner Greive Bobak Taylor & Weber

(57) ABSTRACT

A beam steering device is disclosed which includes an outer assembly rotatable about an axis by a motor assembly, and an inner assembly rotatable about the axis by another motor assembly and positioned radially within the outer assembly. The beam steering device also includes a first prism or grating connected to the outer assembly and a second prism or grating connected to the inner assembly. Both motor assemblies are axially displaced from the steering devices. The beam steering device also consists of beam expansion optics carried by either the inner assembly or the stationary assembly. In a further embodiment, an array of steerable sub-apertures are maintained within the inner and outer assemblies.

24 Claims, 10 Drawing Sheets

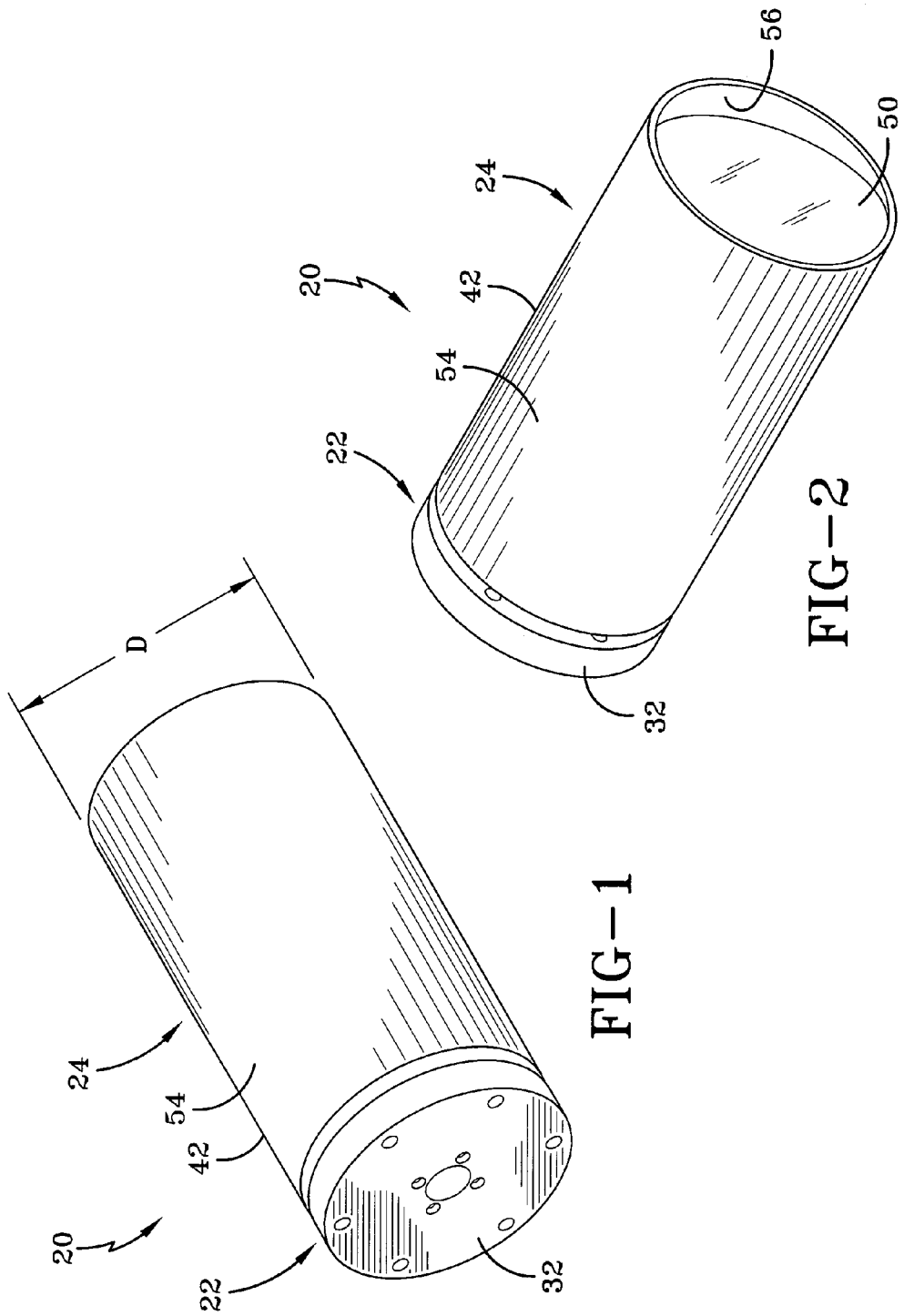

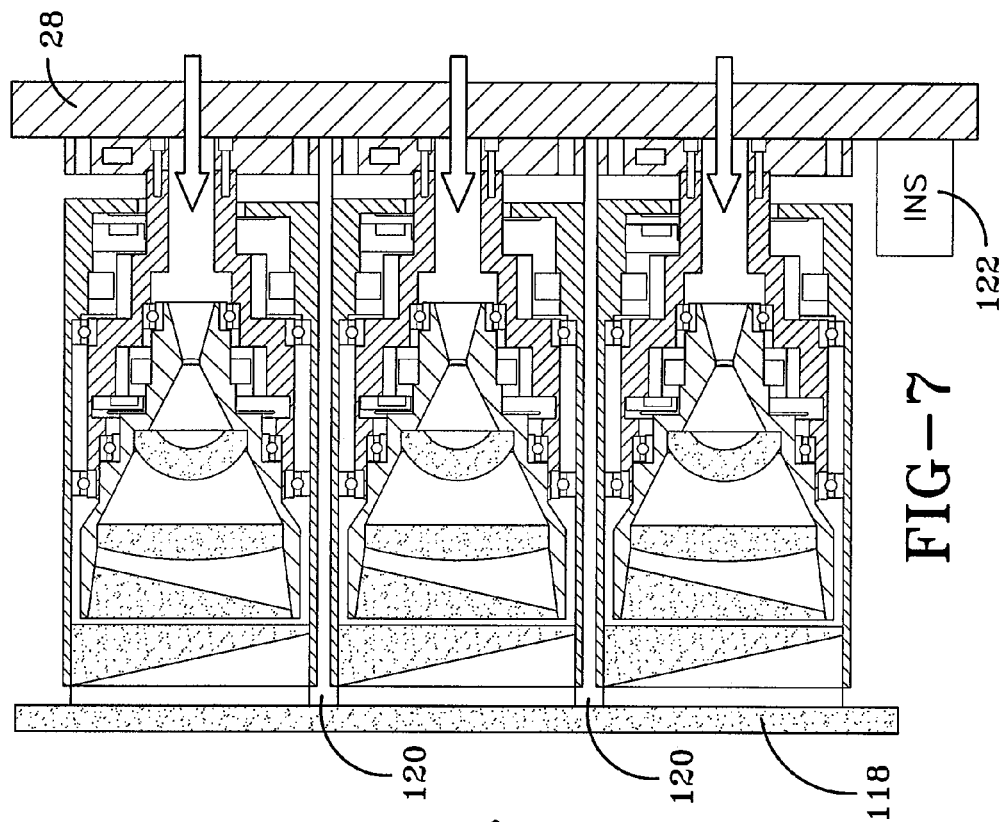
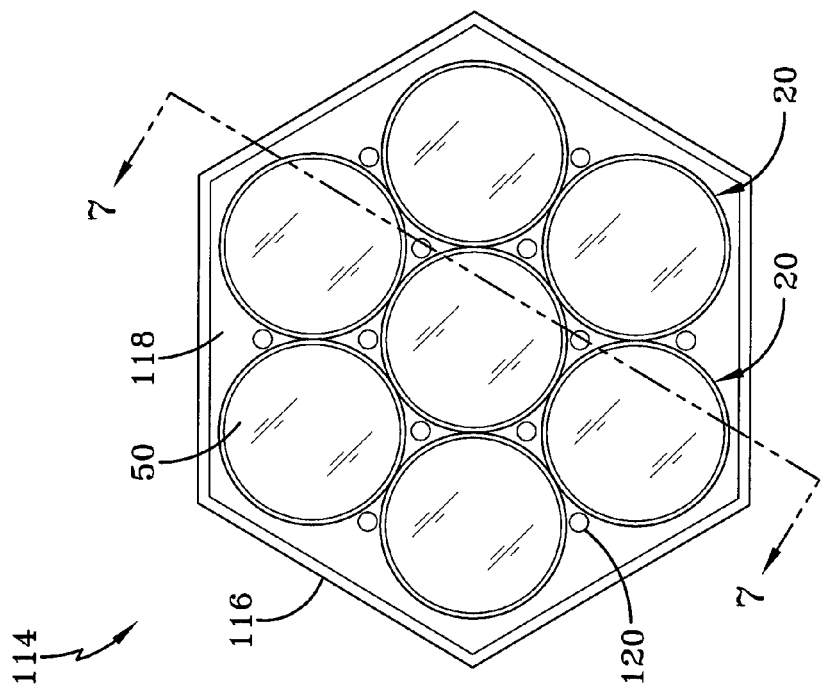

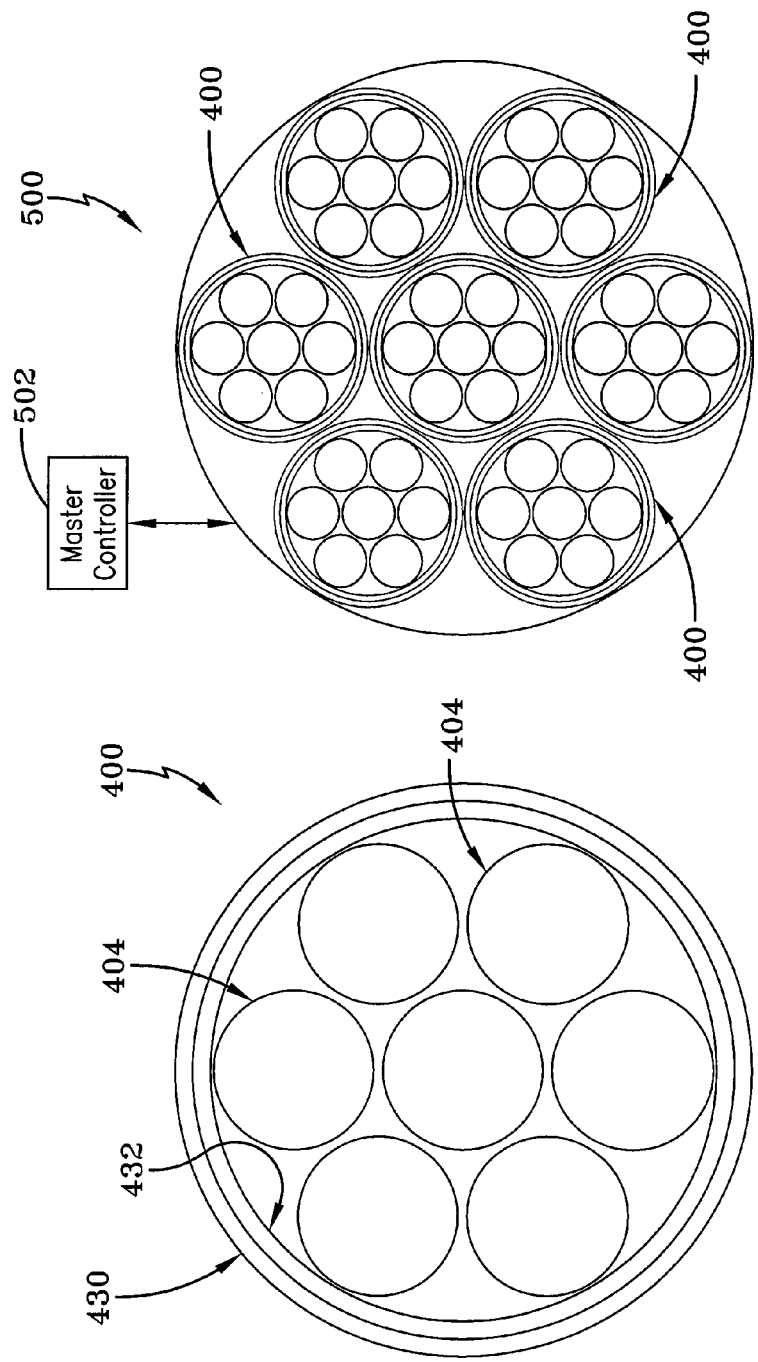

RISLEY INTEGRATED STEERING MODULE

CROSS-REFERENCE TO RELATED APPLICATION

This application is a continuation-in-part application of U.S. application Ser. No. 12/491,924 filed Jun. 25, 2009, now U.S. Pat. No. 7,898,712 which claims priority of U.S. Provisional Application Ser. No. 61/076,175 filed Jun. 27, 2008, both of which are incorporated herein by reference.

TECHNICAL FIELD

The present invention relates to optics, and in particular to a beam steering system used in conjunction with visible and mid-wave infrared light sources. More specifically, the present invention relates to a beam steering system with integrated light beam expansion elements and light beam steering elements. More specifically, the present invention relates to a beam steering system with concentric drive assemblies for independently controlling the light beam steering elements and achieving increased fill factor over prior art forms. The present invention also provides for collective control of multiple light beam steering elements.

BACKGROUND

Generally, beam steering devices are used to change the direction of a propagating energy source, such as a light beam. Multiple beam steering devices may be used in concert to direct multiple light beams as desired, including directing all of the light beams at the same distant point.

Conventional gimbaled mirror arrangements, for example, serve as beam steering devices and use one or more pivoting mirrors to reflect light in a desired direction. Typically, each gimbaled mirror is associated with a single light source. For large beam applications, however, the space required to accommodate a large mirror and gimbal, and the associated weight of the combined large mirror and gimbal, become significant. Given these size and weight restrictions, it is often impractical to use multiple large gimbaled mirror arrangements to direct energy at a single distant point. And, where gimbaled mirrors are used in a conformal arrangement, so that the gimbaled mirror is behind a protective window on the side of a ship, for instance, the size of the window is often limited by the structural necessity of supporting the window. Muntins, or muntin bars, have been used and extend across a window like a grid to support a series of individual panes of glass or optically transmissive material that together make up the window. However, because these muntins could interfere with light transmission, especially at large reflection angles, smaller windows that do not require muntins have been used. Thus, the size of the window has effectively limited the size of the gimbaled mirror used and the field of regard in conformal arrangements.

Refractive beam steering systems, including optical phased arrays and Risley prism modules, have also been developed. Optical phased array beam steering systems use an array of narrow electrodes that are electronically controlled to create a ramp of diffraction gratings that act like birefringent prisms. These arrays are still in the initial stages of development, though, and are characterized by low fill factors, small apertures, high transmission losses, and limited steering angles.

Risley prism modules typically use a pair of rotatable round wedge prisms to redirect a laser beam by refraction. Each wedge prism refracts the laser beam by a certain refraction angle, and the combination of multiple wedge prisms allows for the laser beam exiting the Risley prism module to be refracted at angles (up to the maximum refraction angle) much greater than the refraction angle created by a single wedge prism. The individual wedge prisms of a Risley prism module are controlled and rotated independently, allowing the laser beam to be steered to any position within a solid angle defined by the maximum deflection angle. To facilitate the independent rotation of the wedge prisms, Risley prism modules include the necessary mechanical and electrical components for rotating the wedges. These components are contained within a prism rotating assembly (PRA) that extends radially outward from the periphery of the round wedge prisms. The thickness of the PRA surrounding these Risley prism modules is substantial, so it is impractical to arrange them in an array because the array would be characterized by low fill factors. That is, the area of the array that would be occupied by the PRA surrounding each Risley prism module diminishes the area of the array that actually transmits light. A further drawback of conventional PRAs is that they are not conducive for use in arrays due to their relatively large outer-diameter-to-optical aperture ratio. In other words, the prior art beam steerers with their annular ring containing drive motors and/or feedback devices result in significantly spaced apart assemblies when combined as sub-apertures in an array. The resulting low fill factor increases component size, weight and—for coherently phased arrays—undesirable side lobes.

Also, Risley prism modules only handle beam steering and do not include the optical components necessary to expand or focus a laser beam from a laser beam source. Risley prisms also tend to be axially thick which in some instances may diminish the ability to steer a beam in a desired direction.

Thus, a need exists in the art for a beam steering module capable of expanding and collimating a laser beam, capable of steering a laser beam over a large field of regard, and capable of being arranged in an array characterized by high fill factors. And there is a need to collectively direct light beams emitted from multiple light beam steering elements and improve the fill factor when combining multiple sub-apertures in an array.

SUMMARY OF THE INVENTION

In light of the foregoing, it is a first aspect of the present invention to provide a Risley Integrated Steering Module.

It is another aspect of the present invention to provide a beam steering device comprising an outer assembly rotatable about an axis by a first motor assembly, an inner assembly rotatable about the axis by a second motor assembly and positioned radially within the outer assembly, a first steering device connected to the outer assembly, and a second steering device connected to the inner assembly, wherein both first and second motor assemblies are axially displaced from the first and second steering devices.

BRIEF DESCRIPTION OF THE DRAWINGS

This and other features and advantages of the present invention will become better understood with regard to the following description, appended claims, and accompanying drawings wherein:

FIG. 1 is a perspective view of a Risley Integrated Steering Module constructed according to the concepts of the present invention;

FIG. 2 is a further perspective view thereof;

FIG. 6 is an array of seven Risley Integrated Steering Modules constructed according to the concepts of the present invention;

FIG. 7 is a cross-sectional view of the array taken along line 7-7 of FIG. 6;

FIG. 12 is an end view of the array shown in FIG. 11; and

FIG. 13 is an end view of a large array assembly made according to the concepts of the present invention.

BEST MODE FOR CARRYING OUT THE INVENTION

Figure 3:
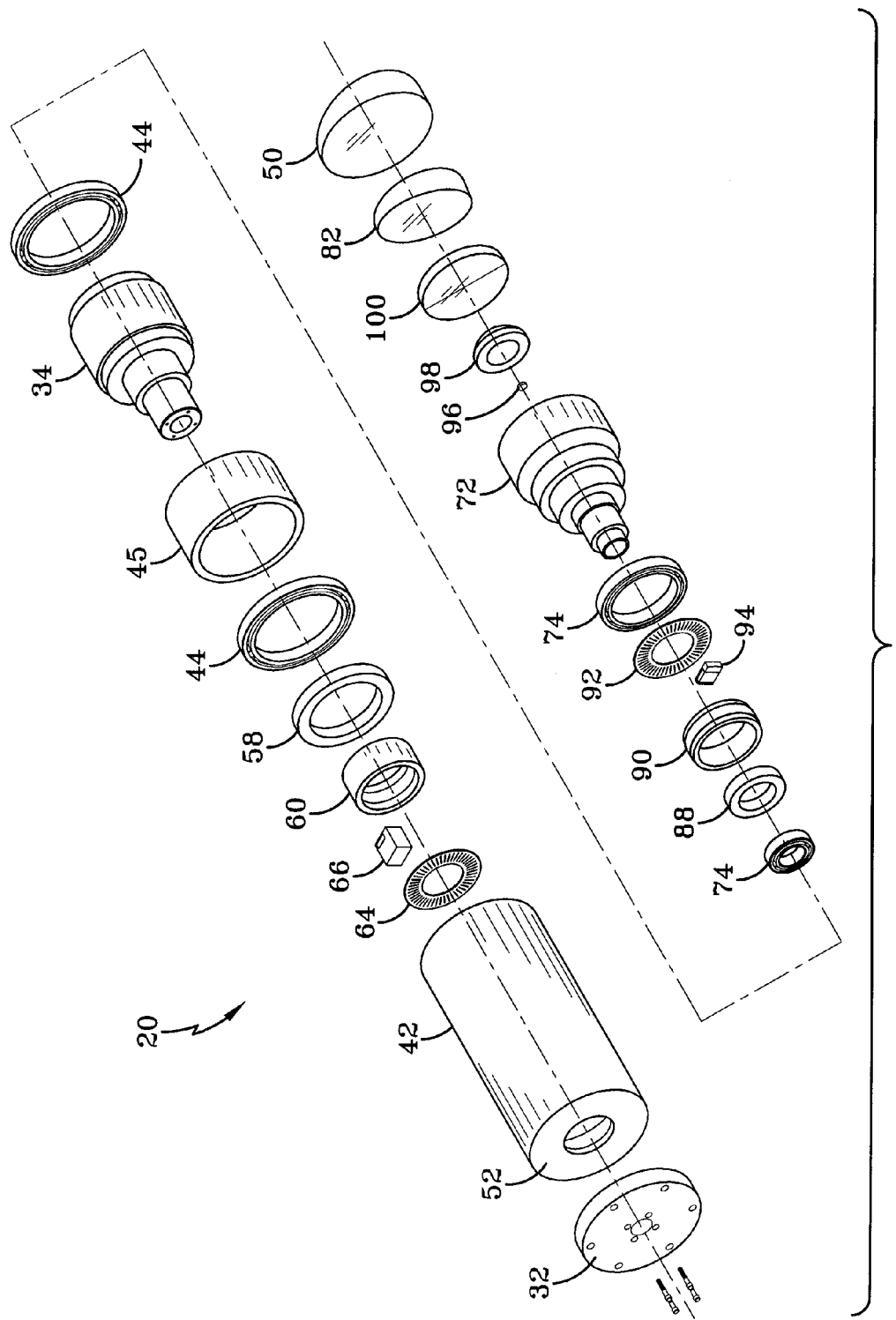
FIG. 3 is an exploded view of the Risley Integrated Steering Module as shown in FIGS. 1 and 2.

Referring now to the drawings, and in particular to FIGS. 1-4, it can be seen that a Risley Integrated Steering Module ("RISM") is designated generally by the numeral 20. It will be appreciated that a single module 20 may be used, or an array of several modules 20 may be used. The module 20 is ideally employed as a transmission device along with an associated laser beam source to expand, direct, and steer a laser beam so that an output beam exiting the module may be selectively directed at a distant point, or target. Of course, the module 20 could also be used as a collection device whereby radiation incident upon the module 20 could be collected and focused at a light collecting device. Although a visible or infrared-based system is disclosed, it will be appreciated that the aspects of the present invention are applicable to other frequency-observable phenomena.

Figure 4:
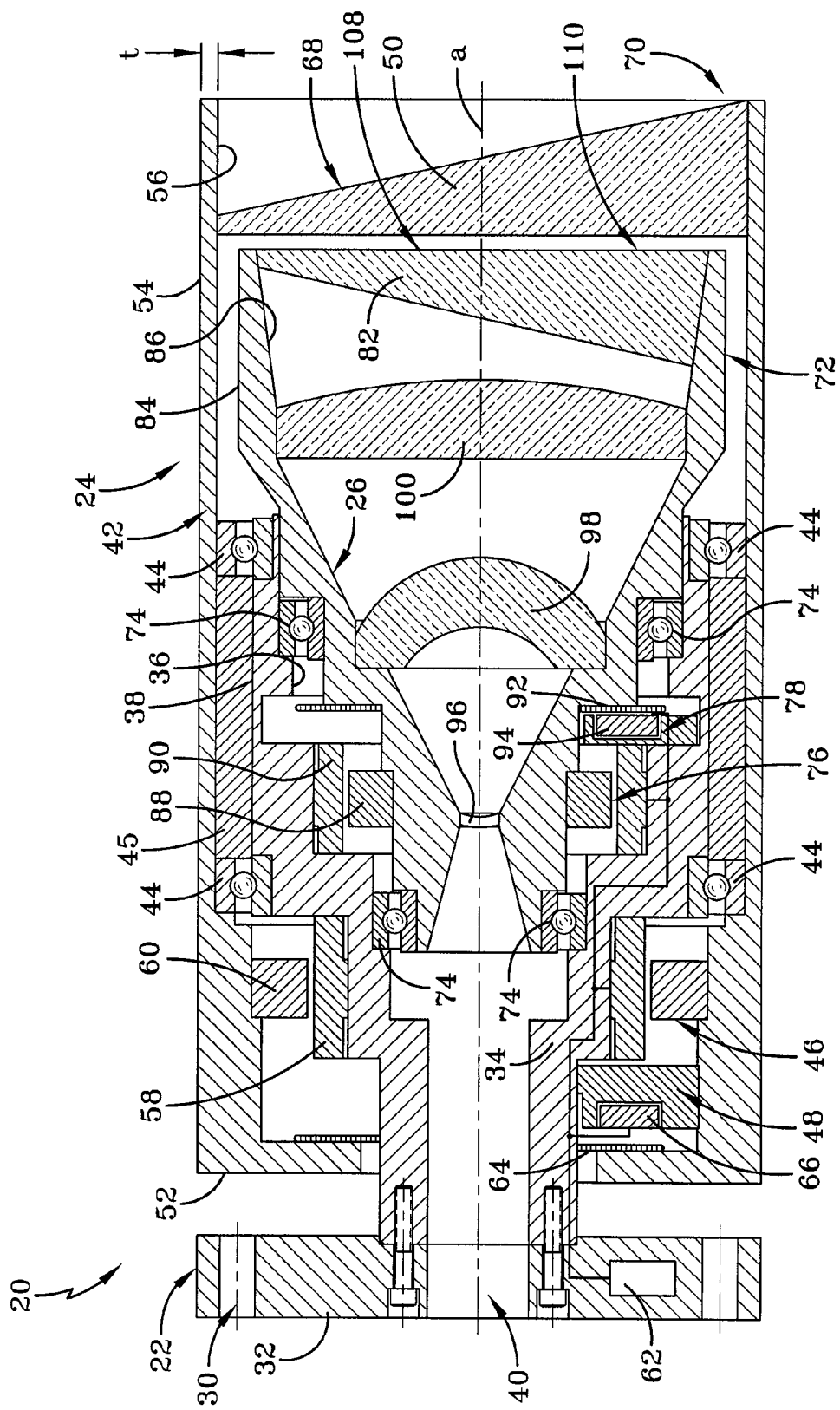
FIG. 4 is a sectional view of the Risley Integrated Steering Module constructed according to the concepts of the present invention.

The module 20 is comprised principally of a stationary assembly 22, a rotating outer assembly 24, and a rotating inner assembly 26, all of which are concentrically arranged about the axis a. As used in this description, the terms "axial" and "axially" refer to the direction along the axis a as shown in FIG. 4, and the terms "radial" and "radially" refer to the direction perpendicular to and extending from the axis a.

The stationary assembly 22 includes a stationary base portion 32 which has a plurality of mounting holes 30 extending therethrough. The mounting holes 30 may be arranged about the periphery of the base portion 32. As will be discussed in more detail, the assembly 22 is attachable to an aperture plate 28 (FIG. 7). Once attached to the aperture plate 28, the stationary assembly 22 is fixed in position with respect to the aperture plate 28, and does not rotate about the axis a. The stationary assembly 22 includes a stationary body portion 34 that is connected to and extends from the stationary base portion 32 into and is rotatably received by the rotating outer assembly 24. The stationary body portion 34 has an inner surface 36 and an outer surface 38. The stationary assembly 22, along axis a, defines an opening 40 through which a laser beam or other light beam may travel. The stationary assembly 22 may be constructed of titanium, steel, aluminum, composite, or similar material, in order to support the other components of the module that are connected to it, including the components associated with the rotating outer assembly 24 and the rotating inner assembly 26.

The rotating outer assembly 24 is comprised of an outer body portion 42, bearings 44, a motor 46, a position encoder 48, and a wedge-shaped prism 50. As seen in FIGS. 1-4, the outer body portion 42 is located radially outside the stationary body portion 34, is generally cylindrical in shape along the axis a and includes an outer body bottom portion 52 that extends radially inward from the body portion 42 at one end. The outer body bottom portion 52 has an opening 53 therethrough that is sized to receive an end of the stationary body portion 34. The outer body bottom portion 52 is orientated generally perpendicular to the stationary body portion 34. The outer body portion 42 has a peripheral surface 54, which defines an overall diameter D of the module, as well as an inner surface 56. The outer body portion 42 has a thickness t at the axial extent of the peripheral and inner surfaces. A typical dimension for t is approximately ⅛" although any dimension less than ½" is believed to be feasible and still provide advantages over prior art constructions. The outer body portion 42 is rotatably mounted to the stationary assembly 22 through the bearings 44. Specifically, a pair of bearings 44 is mounted between the outer surface 38 of the stationary body portion 34 and the inner surface 56 of the outer body portion 42. A spacer sleeve 45 is interposed between facing ends of the bearings 44, and between the outer body portion 42 and the stationary assembly 22. The sleeve 45 is attached to the outer body portion 42, and is rotatable with the rotating outer assembly 24. The bearings 44 allow the outer body portion 42 to rotate about the axis a, relative to the stationary assembly 22. The bearings 44 may be rolling element bearings, magnetic bearings, or any other similar device that permits relatively low-friction rotational movement between the outer body portion and the stationary assembly. Suitable bearings include Timken Super Precision Thin-Section Instrument Ball Bearing models 1017M, 2532M, and 3342M available from The Timken Company in Canton, Ohio.

The motor 46 is a brushless DC motor and includes a stator 58 and a rotor 60. The rotor 60 includes a plurality of permanent magnets and is attached to the inner surface 56 of the outer body portion 42. The stator 58 includes coiled wiring through which electricity is passed to create a magnetic field, and is attached to the outer surface 38 of the stationary body portion 34 in juxtaposition to the rotor 60. The motor 46 is connected to a controller 62. The controller 62, which is shown carried by the stationary base portion 32 but which may be otherwise mounted proximal to the module 20, contains the necessary hardware, software, and memory to implement overall operation of the module 20. The controller 62 is connected or associated with other components such as a laser and/or a focal plane array so as to perform the functions described herein. Indeed, the controller may be configured to handle transmit, receive and bidirectional functions. Advantageously, the electrical connections to components connected to the controller are through stationary components. As such, slip rings or like devices are not required by the module to make electrical connections to the controller. In any event, the motor 46 operates when the controller 62 provides drive signals in the form of electricity to the stator 58, and a magnetic field is established that interacts with the magnetic field of the permanent magnets of the rotor 60. Since the rotor 60 is attached to the outer body portion 42, when the motor 46 is energized the outer body portion 42 rotates about the axis a. The speed and direction of rotation of the outer body portion 42 is controlled by the controller 62. Suitable brushless DC motors are available from Aeroflex Incorporated of Plainview, N.Y.

The position encoder 48 includes an encoder ring 64 and a read head 66. The encoder ring 64 is mounted on the inner surface 56 of the outer body portion 42 opposite the outer body bottom portion 52 and rotates at the same angular rate as the outer body portion 42. The encoder ring 64 includes a plurality of markings that are detectable by the read head 66, which is mounted on the stationary assembly 22. The read head 66 generates and sends to the controller 62 information about the rotational movement of the outer body portion, including position and velocity information. Of course, the mounting location of the encoder ring 64 and the read head 66 can be changed so long as the position encoder 48 provides accurate information about the rotational movement of the outer body portion. For instance, in an alternative embodiment (not shown), the encoder ring 64 could be mounted on the outer body bottom portion 52, and the read head 66 could be mounted on the stationary assembly 22. Suitable position encoders are available from Numerik Jena GmbH of Jena, Germany.

The outer wedge-shaped prism 50 is located at the end of the outer body portion 42 axially opposite the outer body bottom portion 52 and is fixed to the inner surface 56 so that the prism 50 is carried by the outer body portion 42. The prism 50 has a substantially round cross-sectional shape (as shown in FIG. 3) and is generally triangular- or wedge-shaped in its depth direction (as shown in FIG. 4). The prism 50 has a wedge angle $\theta$, and the wedge shape broadens from a thin end 68 to a thick end 70. Since the prism 50 is carried by the outer body portion 42, rotation of the outer body portion 42 causes rotation of the prism 50. The prism 50 may be made of zinc selenide, or any other compound that provides an appropriate refractive index and transmission curve for the wavelength band of interest. As is well known in the art, together the wedge angle and the refractive index define the maximum refraction angle for light passing through the prism 50. Preferably, the construction of the prism 50 is chosen so that the refraction angle is about 25 degrees, though this angle can vary significantly depending on the maximum beam steering angle required for a specific application.

The rotating inner assembly 26 includes an inner body portion 72, bearings 74, a motor 76, a position encoder 78, optical components, and a wedge-shaped prism 82. As seen in FIGS. 1-4, the inner body portion 72 extends radially and axially from within the stationary body portion 34, and is located radially inside the outer body portion 42. The inner body portion 72 has an outer surface 84 opposite an inner surface 86. The inner body portion 72 is rotatably mounted within the stationary assembly 22 through the bearings 74, which are set between the inner surface 36 of the stationary body portion 34 and the outer surface 84 of the inner body portion 72.

The bearings 74 allow the inner body portion 72 to rotate about the axis a, relative to the stationary assembly 22 in a manner similar to the bearings 44 described above. Suitable bearings include Timken Super Precision Thin-Section Instrument Ball Bearing models 1017M, 2532M, and 3342M available from The Timken Company in Canton, Ohio.

The motor 76 is a brushless DC motor, includes a rotor 88 and a stator 90, and operates in a manner similar to the motor 46 described above. The motor 76 is connected to and operationally controlled by the controller 62. Since the rotor 88 is attached to the inner body portion 72, when the motor 76 is energized the inner body portion 72 rotates about the axis a.

The speed and direction of rotation of the inner body portion 72 are controlled by the controller 62. Suitable brushless DC motors are available from Aeroflex Incorporated of Plainview, N.Y.

The position encoder 78 includes an encoder ring 92 and a read head 94, and operates in a manner similar to the position encoder 48 described above. The encoder ring 92 is mounted on the outer surface 84 of the inner body portion 72, and rotates at the same angular rate as the inner body portion 72. The read head 94 is mounted on the inner surface 36 of the stationary body portion 34. The position encoder 78, and specifically the read head 94, generates and sends to the controller 62 information about the rotational movement of the inner body portion 72, including position and velocity information. Suitable position encoders are available from Numerik Jena GmbH of Jena, Germany.

Figure 5:
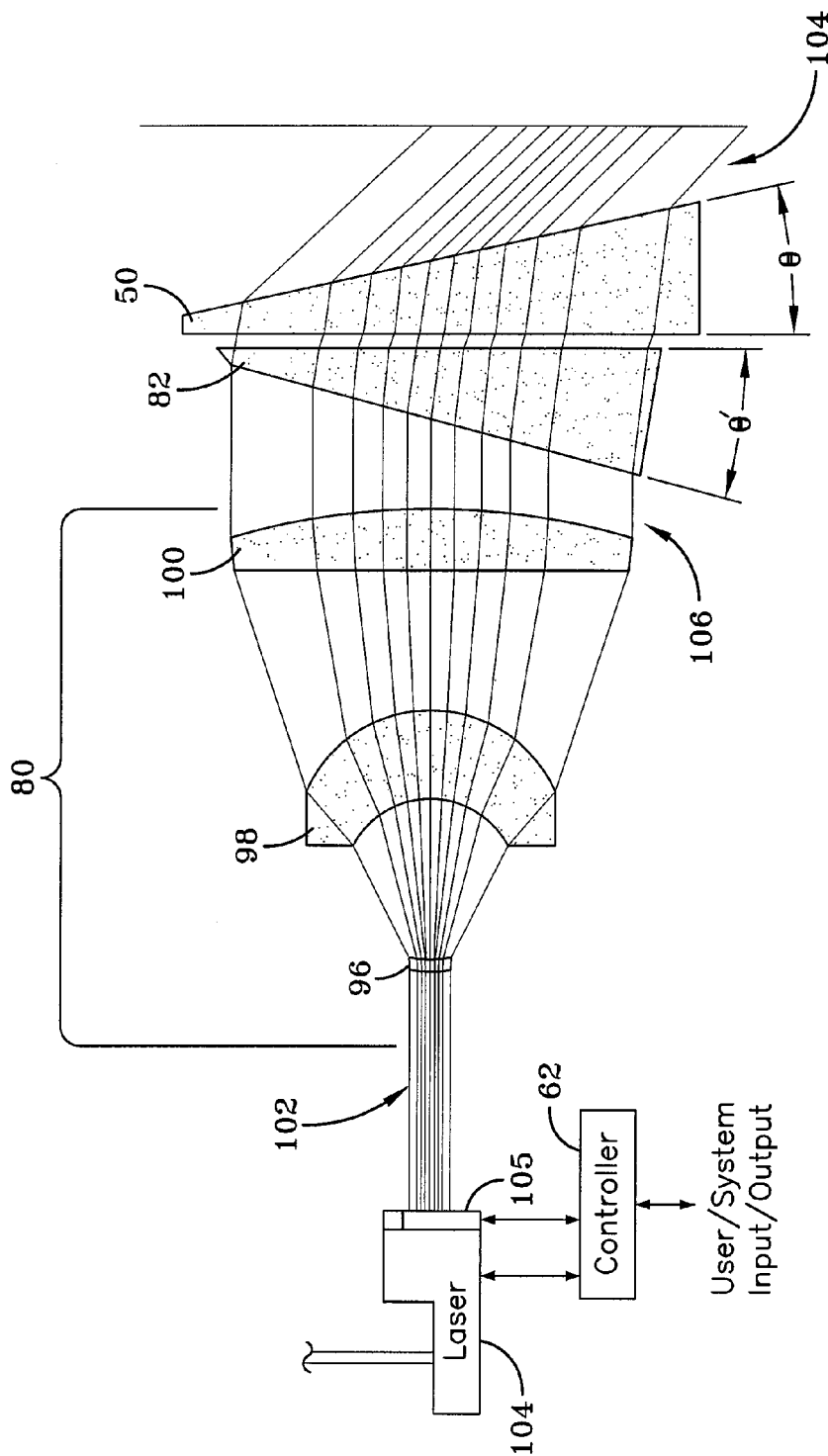
FIG. 5 is a schematic representation of the Risley Integrated Steering Module with a representative ray tracing of laser light travelling therethrough.

Optical components 80, as seen in FIGS. 4 and 5, carried by the module 20 include a first lens 96, a second lens 98, and a third lens 100, all carried by the inner body portion 72, that serve to expand a laser beam 102 from a laser beam source 104 for transmission out of the module 20. Of course, in an alternative embodiment where the module 20 is used as a collection device, the optical components would serve to collect radiation incident upon the module 20 and direct it to a collection device such as a focal plane array 105. Both the laser beam source 104 and the focal plane array 105 are connected to and operationally controlled by the controller 62. The first lens 96 causes substantial divergence, or expansion, of the laser beam 102, and may be a plano-concave or biconcave lens. The second lens 98 causes further divergence of the laser beam and may be plano-convex, or a meniscus lens. The third lens 100 causes convergence of the expanded laser beam into a collimated laser beam 106, or a beam whose rays are nearly parallel, and may be a plano-convex lens. The diameter of an output beam 104 that exits the module 20 is strongly related to the diameter d of the third lens 100. Together, the optical components 80 diverge and then converge the laser beam 102 transforming it into an expanded and collimated laser beam 106 for transmission out of the module 20. The optical components 80 are made of optical grade glass, such as BK7 glass, or some other material that is capable of handling the energy of the laser beam 102. In the present embodiments, the optical components 80 are able to withstand energy levels of roughly 20 kW/cm$^2$. Of course, the relative size, shape, and position of the optical components 80 may be adjusted to meet specific module design and output beam characteristics.

The inner wedge-shaped prism 82 is located at the axial end of the inner body portion 72, is fixed to the inner surface 86 so that the prism 82 is carried by the inner body portion 72, and has a diameter slightly less than the diameter of the outer prism 50. The prism 82 has a round cross-sectional shape (as shown in FIG. 3) and is generally triangular- or wedge-shaped in its depth direction (as shown in FIG. 4). The prism 82 has a wedge angle $\theta'$, and the wedge shape broadens from a thin end 108 to a thick end 110. In some embodiments, the wedge angles ($\theta$ and $\theta'$) are equal, though they need not be. Since the prism 82 is carried by the inner body portion 72, rotation of the inner body portion 72 causes rotation of the prism 82. The prism 82 may be made of zinc selenide, or any other compound that provides an appropriate refractive index and transmission curve for the wavelength band of interest. As is well known in the art, together the wedge angle and the refractive index define the maximum refraction angle for light passing through the prism 82. Preferably, the construction of the prism 82 is chosen so that the refraction angle is about 25 degrees, though this angle can vary significantly depending on the maximum beam steering angle required for a specific application.

Turning to FIG. 5, a ray tracing can be seen showing a laser beam 102 as it travels through the optical components 80 and then the wedge shaped prisms 82, 50 of the module 20 as it is shown in FIG. 4. The laser beam 102 originates from a laser beam source 104. The laser beam source 104 may be any wavelength, though mid-wave infrared, short-wave infrared, near infrared or visible laser systems would be used for most applications. Upon impinging on the first lens 96, substantial divergence of the laser beam 102 occurs. The second lens 98 causes further divergence of the expanded laser beam, though to a lesser extent than the divergence caused by the first lens 96. The third lens 100 converges the expanded laser beam in order to create a collimated laser beam 106, with rays that are substantially parallel to one another. The collimated laser beam 106 goes through the inner wedge prism 82, and its rays are refracted, or bent, in the direction of the thick end 108 of the prism 82. After exiting the inner wedge prism 82, these rays are further refracted by the outer wedge prism 50, with a resulting output beam 104 exiting the module 20.

The controller 62 receives input including position and velocity information regarding the outer and inner assemblies from the position encoders 48, 78. The controller 62 also receives user input from a user, or a computer system controlled by a user. The controller 62 is capable of generating output drive signals to the motors 76, 46 for operating the rotating inner assembly 26 and rotating outer assembly 24, respectively. The controller 62 is also capable of generating activation signals to the laser beam source 104 for selectively activating and de-activating the laser beam 102.

The rotating inner assembly 26 may be operated to rotate the inner wedge prism 82 and the rotating outer assembly 24 may be operated to rotate the outer wedge prism 50. The two wedge prisms 50, 82 may be rotated independently of one another, in either direction and at different speeds, thus creating three possible rotation scenarios. First, the inner wedge prism 82 may be rotated while the outer wedge prism 50 is held stationary. Second, the inner wedge prism 82 may be held stationary while the outer wedge prism 50 is rotated. And third, both the inner wedge prism 82 and the outer wedge prism 50 may be rotated at the same time in the same or opposite directions. Based on the angles that the inner wedge prism 82 and the outer wedge prism 50 refract light, the combination of the inner wedge prism 82 and the outer wedge prism 50 is capable of refracting light at an angle up to a maximum refraction angle. And while the module 20 is capable of refracting light at angles up to the maximum refraction angle, the relative orientation of the inner wedge prism 82 and the outer wedge prism 50 may be selected to cause refraction at any angle less than the maximum refraction angle. Thus, the module 20 may be used to direct the output beam 104 at any point inside the solid angle defined by the maximum refraction angle. This 3-dimensional space over which the output beam 104 may be directed constitutes the field of regard of the module. Typically, the field of regard of the module 20 is about ±50°, though other fields of regard may be used for various applications.

There are several configurations of the invention that may be desirable for specific applications. The module's beam expanding telescope (comprised of lenses 96, 98 and 100 in FIG. 4) can be designed with fewer than three lenses or more than three lenses to provide the required optical characteristics. Also, one, several or all of the beam expander lenses can be fixed to the stationary body portion 34 instead of the rotating inner body portion 72. A fixed lens configuration still takes advantage of the integrated beam expander/beam steerer approach by placing motors, bearings and encoder components in the volume provided at the narrow-diameter end of the beam expanding telescope, thus providing improved fill factor over conventional Risley beam steering devices. It has the advantage of eliminating nutation, caused by misalignment of optically rotating parts, and provides a thermal conduction path to the module base to simplify thermal management. However, a module with fixed, non-rotating beam expander lenses may not have as high a fill factor as a module with rotating beam expander lenses.

In addition to using a singular module 20, several of the modules 20 may be arranged in an array, as shown in FIGS. 6 and 7. FIG. 6 shows a seven-module array 114 within a framework 116, where the modules 20 are in a conformal arrangement. In a conformal arrangement the modules are all positioned behind a window. Such a conformal arrangement might be used, for instance, if the array were located behind a flat surface of a ship or an airplane, so that the array would not protrude from the side of the ship or airplane. Given the small thickness t of the outer body portions 42, when the modules are placed near one another as shown in FIG. 6, there is relatively little space between the outer wedge prisms 50. As will be discussed more fully below, the less distance there is between the outer wedge prisms 50 (as well as the optical components 80), the higher the array's fill factor.

When configured in an array, the round shape of each module 20 allows the modules 20 to be placed near one another. The modules are spaced very closely together but are not allowed to touch each other since their rotating outer assemblies rotate independently. The rotational movement of each module 20 is confined within the radius D of the module 20. Thus, there is no need to space the modules away from one another to accommodate an area swept out by a different-shaped module.

To support the weight of a window 118 covering the array 114, several support posts 120 are interspersed between the modules 20 and between the modules 20 and the framework 116. The support posts 120 are constructed of titanium, steel, aluminum, or similar material in order to collectively support the window 118 so that the window 118 does not deform, either under its own weight or under a differential air pressure, in a way that would impact the transmission of the output beams 104. Since the posts 120 are all similarly constructed, any expansion or contraction in the posts 120 should be uniformly reproduced, and therefore should have a minimal impact on the performance of the posts 120 in supporting the window 118. The window 118 is constructed of optical glass, zinc selenide, or any other compound that provides appropriate mechanical characteristics and transmission curve for the wavelength band of interest, and is capable of withstanding the total energy of the output beams 104 in the array.

Each module 20 of the array 114 is associated with its own controller 62. If appropriate, user or system input/output can be used to collectively control each module 20 via the corresponding controller 62. The array 114 also includes an inertial navigation system, or INS, 122 that provides each controller 62 with INS information, including time rate of change information in all three dimensions for the relative movement of the array 114. Because each module 20 of the array 114 is associated with its own controller 62, each module 20 can be operated independently of the other modules. Thus, the output beam 104 for each module 20 may be steered in any direction within the field of regard. For instance, all of the output beams 104 exiting the modules 20 may run parallel to each other, which would roughly approximate an output beam from a much larger module. These output beams may be combined coherently (in phase) or incoherently. Also, the output beams 104 may all be directed at slightly different angles in order to intersect, or focus, at a distant point. Focusing all of the output beams 104 at a distant point, or target, might be useful, for instance, in order to increase the total energy impinging that distant target. In addition, the modules 20 may be controlled in other possible ways, including using a single module 20 to steer an output beam in a different direction than the other modules 20. Or, some of the modules 20 of the array 114 might be used as collection devices while others may be used as transmission devices. Further still, some of the modules 20 of the array 114 may not be used if energy conservation is a concern.

Figure 8:
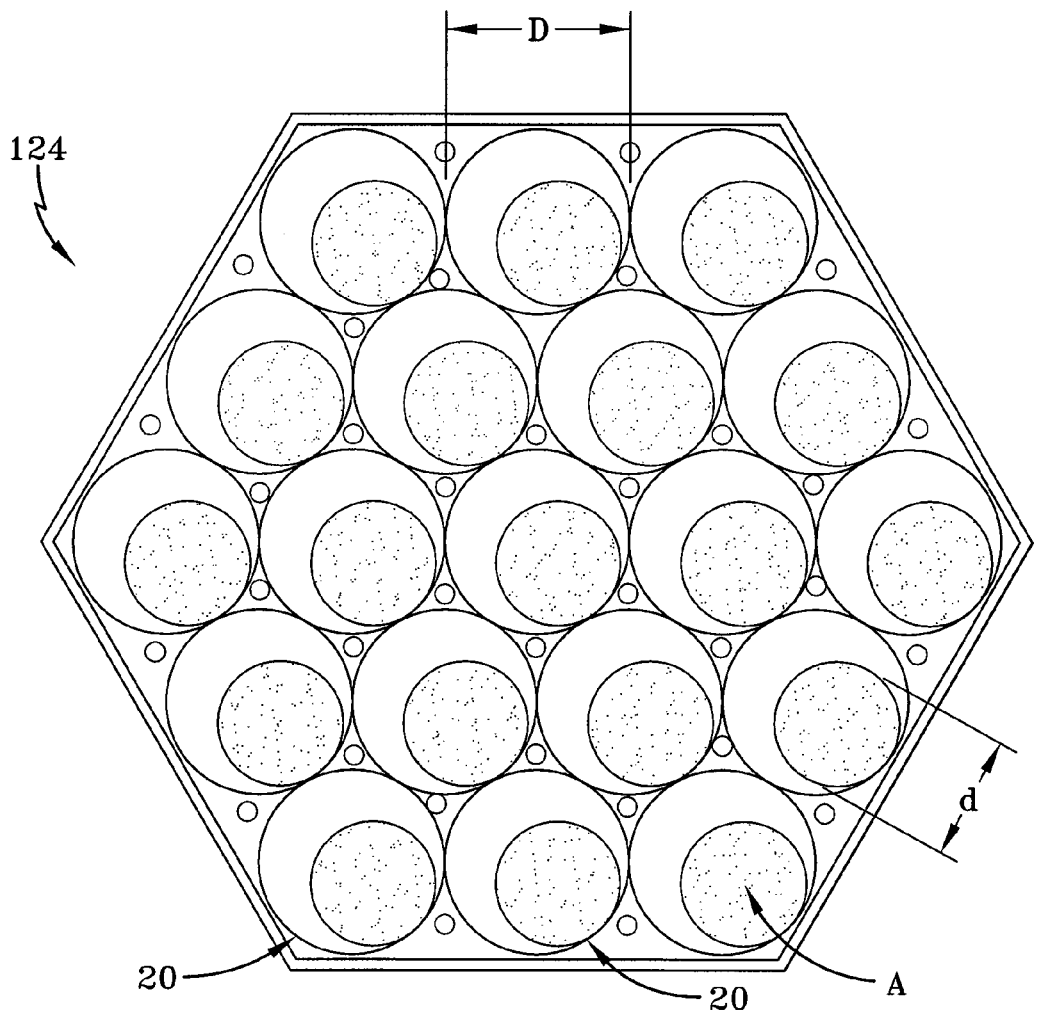
FIG. 8 is an array of nineteen Risley Integrated Steering Modules constructed according to the concepts of the present invention.

Turning to FIG. 8, a nineteen-module array 124 is shown and demonstrates a significant advantage over prior art forms. Each module 20 has a diameter D, and an outer body portion with a thickness t. Each module 20 also has an output beam area A. The thickness t of the outer body portion 42 is substantially smaller than the prism rotating assembly (PRA) surrounding prior art form Risley prism modules. When the modules 20 of the present invention are arranged near one another as shown in FIG. 8, the output beam 104 areas A are relatively close together. Thus, the portion of the area within the array 124 occupied by the output beam 104 areas A is greater for modules 20 constructed according to the concepts of the present invention than would an array of prior art forms. The fraction of the area of the array 124 occupied by the output beam 104 areas A is referred to as the "fill factor," and for reasons of efficiency, high fill factor values are desirable.

The fill factor of a single module 20 is the area of the output beam 104 divided by the area of the module 20. The output beam 104 has roughly the same diameter as the diameter d of the third lens 100, and the module 20 has a diameter D. The fill factor of a single module 20 may be expressed as:

$$FillFactor = \frac{BeamArea}{ModuleArea} = \frac{\pi(d/2)^2}{\pi(D/2)^2} = \left(\frac{d}{D}\right)^2$$

Thus, for modules 20 having the same diameter D, the fill factor of a single module 20 is a function of the output beam area. In one embodiment, the fill factor of a single module 20 is about 50%. In other embodiments, the fill factor for a single module 20 can range from about 50% to about 90%.

The fill factor for an array of several modules depends on the geometrical configuration of the array and the number of modules in the array. For instance, FIG. 8 shows a nineteen-module hexagonal array 124, with (x) five modules across the hexagon. The area of a regular hexagon is given as $$A_{hexagon} = \frac{3\sqrt{3}}{2}s^2,$$

where s=the length of a side of the hexagon. Inside the hexagon are nineteen modules taking up an area $$Area_{modules} = 19 \cdot \pi \left(\frac{D}{2}\right)^2.$$

For large numbers (x) of modules across the hexagon, s may be approximated as $$s \cong \frac{D \cdot x}{2}.$$

Thus, the fraction of the area of the array taken up by n modules 20 is approximated as:

$$\frac{Area_{modules}}{Area_{hexagon}} = \frac{n \cdot \pi \cdot (D/2)^2}{(3\sqrt{3}/2) \cdot (D \cdot x/2)^2}$$

Preferably, the fraction of the areas given above is about 90%.

The total fill factor of the array, then, will be the fill factor of an individual module multiplied by fraction of areas given above, and represents the fraction of the total area of the array that is occupied by the area of the output beams, and may be given as $$\text{Total Fill Factor} = \text{Fill } Factor_{single\ module} \cdot \frac{Area_{modules}}{Area_{array}}.$$

Again, high total fill factor values are desirable for efficiency reasons, and the total fill factor for an array is preferably somewhere in the range of roughly 50-80%.

Figure 9:
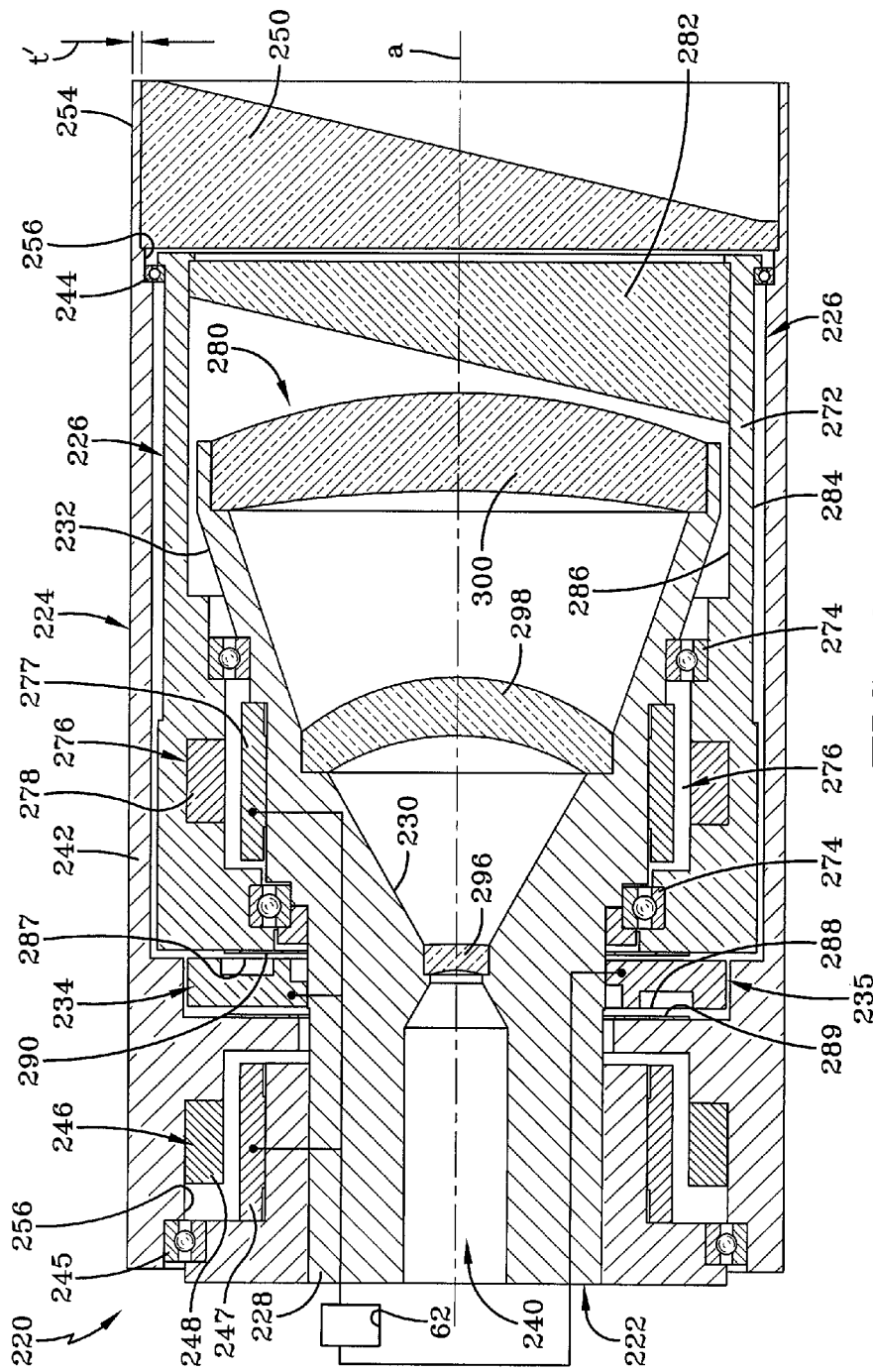
FIG. 9 is a sectional view of a further embodiment of a Risley Integrated Steering Module constructed according to the concepts of the present invention.

Referring now to FIG. 9, an alternative Risley Integrated Steering Module is designated generally by the numeral 220. Module 220 is similar to module 20, except that the optical components are carried by a stationary body portion and that the position relationship of the rotating assemblies with respect to the stationary assembly has been slightly revised. It will be appreciated that most of the components of module 220 are functionally and structurally similar to the components of module 20, and therefore the description of module 220 will be essentially limited to describing the orientation relationship of its components.

Module 220 is comprised principally of a stationary assembly 222, a rotating outer assembly 224, and a rotating inner assembly 226, all of which are concentrically arranged about the axis a. The stationary assembly 222 is adapted to be attached to an aperture plate, as discussed with respect to module 20. Once attached to an aperture plate, stationary assembly 222 is fixed in position with respect to the aperture plate and is not free to rotate about the axis a.

Stationary assembly 222 includes a stationary body portion 228 that extends axially and radially within outer assembly 224 and inner assembly 226. Stationary body portion 228 includes an inner surface 230 and an outer surface 232. The outer surface 232 carries two position encoders 234 and 235 which face in opposite directions and which are shown diametrically opposed, although diametric opposition is not required. The stationary assembly 222, along axis a, defines an opening 240 through which a laser beam or other light beam may travel. As will be discussed, the stationary assembly 222 carries optical components 280.

The rotating outer assembly 224 includes an outer body portion 242, bearings 244 and 245, a motor 246, and a wedge-shaped prism 250. The outer body portion 242 is located mostly radially outside stationary body portion 228 and rotating inner assembly 226, and is generally cylindrical in shape. The outer body portion 242 has an outer peripheral surface 254, which defines an overall diameter D of the module, and an inner surface 256. As seen in FIG. 9, the outer surface 254 is generally continuous, but that the inner surface 256 is generally discontinuous. In other words, surface 256 has various protrusions so as to conform with other components of the module 220. The outer body portion 242 has a thickness V at the axial extent of the peripheral and inner surfaces. The outer body portion 242 is rotatably mounted to the rotating inner assembly 226 through the bearings 244 and the stationary assembly 222 through the bearings 245. Specifically, bearing 245 is mounted between the outer surface 232 of the stationary body portion 228 and the inner surface 256 of the outer body portion 242 proximal a mounting end of the module. Bearing 244 is mounted between the inner surface 256 and an outer surface 284 of an inner body portion of rotating inner assembly 226 proximal a prism end of the module.

An outer wedge-shaped prism 250 is located at the end of the outer body portion 242 away from the mounting end and is fixed to the inner surface 256 so that the prism 250 is carried by the outer body portion 242 and rotates therewith. Prism 250 is substantially similar to prism 50.

The rotating inner assembly 226 includes an inner body portion 272, bearings 274, a motor 276, and a wedge-shaped prism 282. Inner body portion 272 is located radially inside the outer body portion 242, and is mostly located radially outside stationary body portion 228. Inner body portion 272 has an outer surface 284 and an inner surface 286. The surfaces 284 and 286 are generally discontinuous so as to conform with adjacent assemblies of the module 220. Inner body portion 272 is rotatably mounted to the stationary assembly 222 through the bearings 274, which are set between the outer surface 232 of the stationary body portion 228 and the inner surface 286 of the inner body portion 272. The bearings 274 allow the inner body portion 72 to rotate about the axis a, relative to the stationary assembly 222.

Permanent magnet motors 246 and 276 are employed to rotate the outer assembly 224 and the inner assembly 226 with respect to the stationary assembly 222. Specifically, the motor 246 includes a stator 247 and a rotor 248. The stator 247 is mounted to the stationary assembly 222 and specifically the outer surface 232 of the stationary body portion 228. Juxtaposed with respect to the stator 247 is the rotor 248 which is carried by the inner surface 256 of the outer rotating assembly 224. In a similar fashion, the motor 276 is mounted in between the inner rotating assembly 226 and the stationary assembly 222. Specifically, the stator 277 is carried by the outer surface 232 between the bearings 274. The rotor 278 is juxtaposed with respect to the stator and is carried by the inner surface 286 of the rotating assembly 226. As in the previous embodiment, the rotational movement of the assemblies is initiated by the motors, wherein the stators 247 and 277 are connected to a controller 62 so as to impart electrical energy. Skilled artisans will appreciate that the motors 246 and 276 are axially displaced from the respective prisms (250 and 282) that they rotate. This allows for maximum utilization of space as described in relation to the embodiments shown in FIGS. 4-8.

In order to control speed and rotation of the motors and thus the guidance of a laser beam out of the module 220, the position encoders 234 and 235 each have respective read heads 287 and 288 that are utilized to monitor the rotational positions of the rotating outer assembly 224 and the rotating inner assembly 226. An encoder ring 289 is mounted on an inner surface 256 of the outer body portion 242 that faces the read head 288. In a similar manner, the read head 287 is positioned so as to monitor the rotational position of an encoder ring 290 which is mounted on a facing surface 284 of the inner rotating assembly 226. The position encoders 234 and 235 are connected to the controller 62 which monitors and provides input to the motors 246 and 276. In this manner the rotational positions of the prisms associated with the rotating assemblies is known to the controller so as to control steering of the laser beam proceeding through the optical lenses and the Risley prisms, wherein the Risley prisms comprise the optical components 250 and 282.

Optical components 280 are carried by the module 220 include a first lens 296, a second lens 298, and a third lens 300, all of which are carried by the stationary body portion 228, and all of which are similar to lenses 96, 98, 100. In this respect module 220 is different from module 20. In module 20, the optical components are carried by the rotating inner assembly 26, whereas in module 220, the optical components are carried by the stationary body portion 228. One advantage of the construction shown in FIG. 9 is that the optical components 280 do not rotate, so the operator is assured that subtle variations in the construction of the optical components do not cause changes to the beam path, as could, in theory, be possible with the arrangement shown in FIG. 4. Also, since rotating inner assembly 226 is only carrying prism 282, less energy is required in the operation of rotating inner assembly 226. Of course, it will be appreciated that like module 20, module 220 may be used for either transmission or collection of radiation, and that several modules 220 may be arranged in an array.

Figure 10:
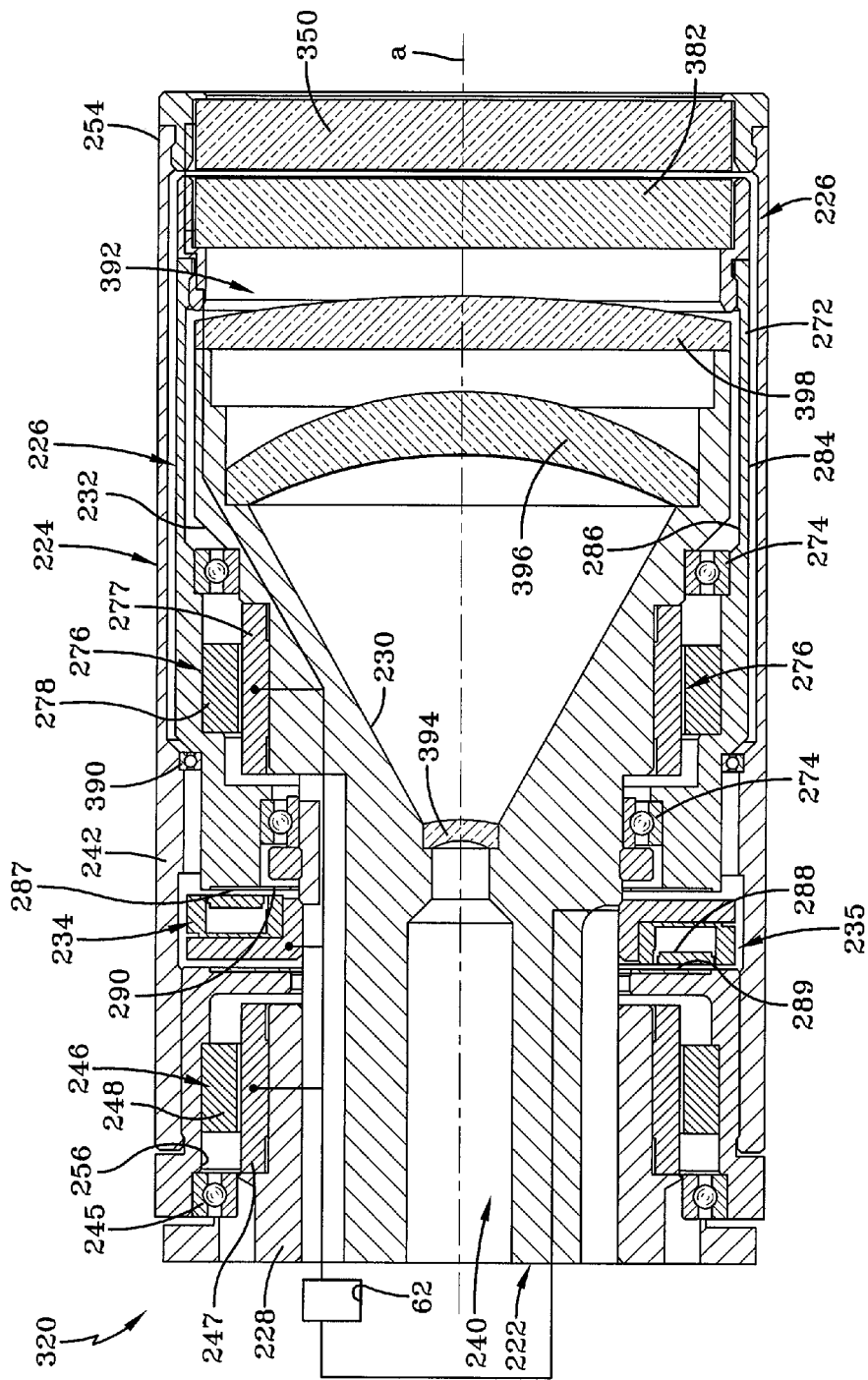
FIG. 10 is a sectional view of another embodiment of a Risley Integrated Steering Module constructed according to the concepts of the present invention.

Referring now to FIG. 10, another alternative Risley Integrated Steering Module is designated generally by the numeral 320. The module 320 utilizes similar components as the module 220 and, as such, the similar components retain the same identifying numerals. Unless expressly indicated otherwise, the structural and operational features of the previously discussed embodiments are incorporated into the present embodiment. A number of the major components remain the same, notably the stationary assembly 222, the rotating inner assembly 226 and the rotating outer assembly 224. The significant difference is the present embodiment utilizes Risley gratings in place of Risley prisms. Specifically, an outer Risley grating 350 is utilized in place of the Risley prism and carried by the rotating outer assembly. An inner Risley grating 382 is utilized in place of the Risley prism and is carried by the rotating inner assembly 226. The Risley gratings 350 and 382 utilize diffractive optics instead of refractive optics to steer a light beam in a desired direction. The module may also use the gratings as a collection device. In addition to reducing the amount of weight of the overall assembly, the gratings have a reduced width so as to improve the fill factor over embodiments which utilize prisms and refractive optics. As a result, the beam steering techniques provided by the gratings allow for a reduction in the module's outer diameter-to-optical aperture ratio. This reduction in size and lower mass of a Risley grating, as opposed to a Risley prism, can be utilized to position bearings around the beam expander optics as opposed to the steering optics thereby decreasing the outer diameter of the module for a given optical aperture.

By utilizing Risley gratings instead of Risley prisms, the outer rotating assembly and inner rotating assembly are separated from one another and are rotatable with respect to one another by utilizing a bearing 390. As can be seen in FIG. 10, the bearing 390 is positioned axially between the bearings 274 which are disposed on either side of the motor assembly 276 instead of being axially on either side of the motor assembly. In other words, use of bearing 390 replaces the previous embodiment's use of bearing 244 to provide an improvement in fill factor. With use of the narrower Risley devices in form of the gratings 350 and 382, the internal optical components 392 can also be slightly re-configured from the other embodiments. The optical components include a first lens 394 which expands the received or laser beam or other light beam that is directed through lenses 396 and 398 to the rotatable Risley gratings.

The module 320 operates in substantially the same manner as the other modules, except for the use of the Risley gratings. It will be appreciated that kilowatt class fiberlasers are available and that it is further desired to combine multiple fiber-laser beams (coherently or incoherently) in arrays of sub-apertures in order to maximize energy on a target. Utilization of the module 320 allows for easy application of the conformable array to airborne, shipboard and ground-based missions. These are advantageous over prior art configurations which are limited by small apertures, high losses and high fill factors. By utilizing drive mechanisms for the optical components that are axially displaced from the steering devices fill factor improvements can be obtained. In other words, the motor assemblies 246 and 276 are axially positioned in the overall assembly housing so as to have an outer diameter less than the outer diameter of the grating and/or prism. This beam steering approach is applicable to phased array (coherently combined) applications in which beam sidelobes become prohibitively large at low fill factors (less than 60-70% area).

Figure 11:
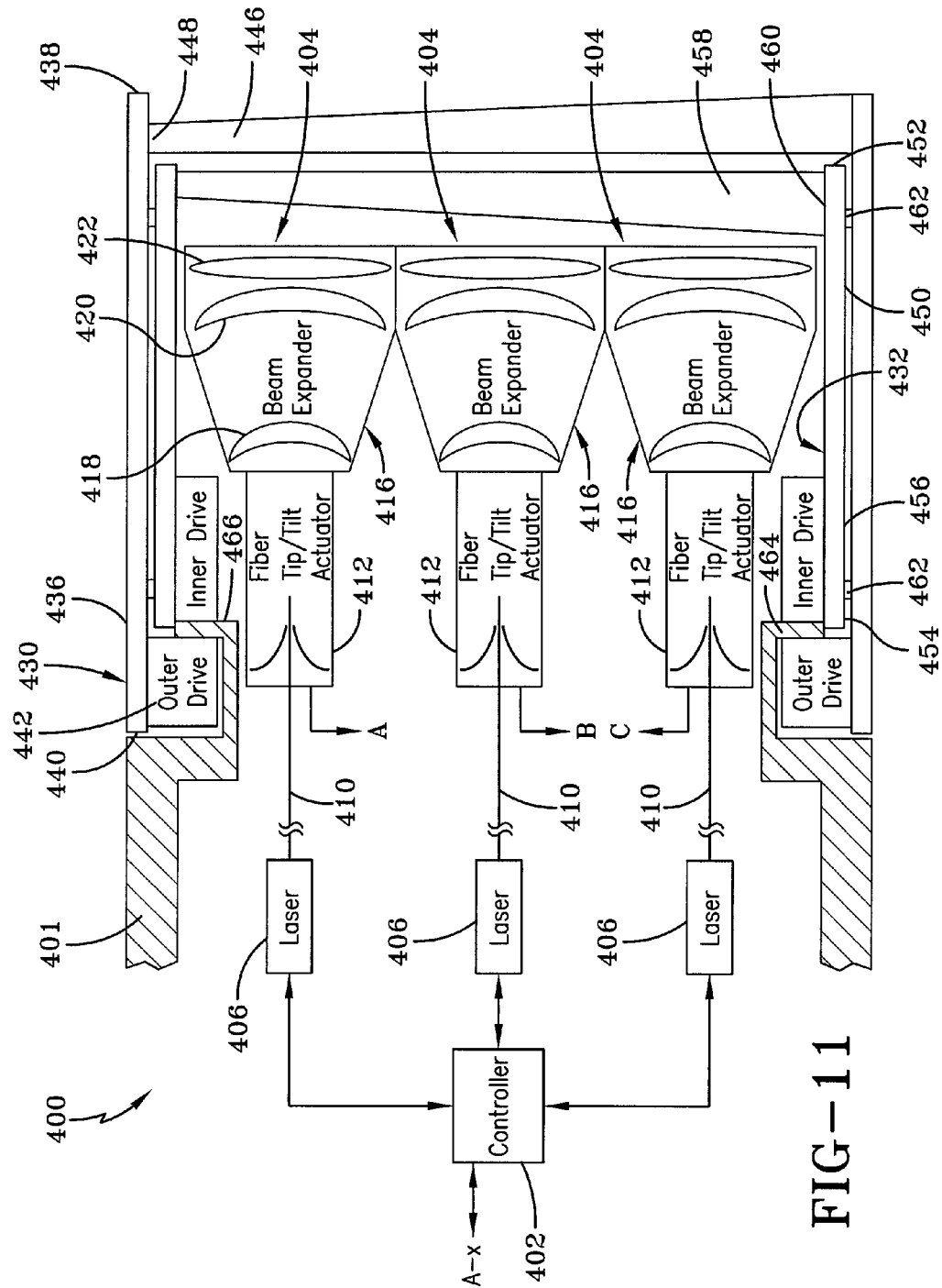
FIG. 11 is a cross-sectional view of a steering module array with multiple steerable sub-apertures.

Referring now to FIGS. 11 and 12, a Risley Integrated Steering Module array with multiple steerable sub-apertures is designated generally by the numeral 400. The array includes a housing 401. A controller 402 controls the operation of steering sub-apertures, each of which is designated by the numeral 404. Although seven sub-apertures are shown, it will be appreciated that two or more sub-apertures could be provided by any array. Each sub-aperture includes a light source such as a laser 406 which generates a laser light that is directed along an optical fiber 410 to transmit the appropriate light waves. The fiber 410 is received by a tip/tilt actuator 412 which provides for fine adjustment of the light beams. The actuators 412 are utilized to direct the light beam in a desired path or direction. Each actuator 412 is associated with a beam expander 416 which includes a series of lenses 418, 420 and 422 which function to focus or diverge the light beam as desired. The array 400 utilizes an outer rotatable assembly 430 and an inner rotatable assembly 432 in much the same manner as shown in the other embodiments. In other words, the array contains any number of sub-apertures which generate corresponding light beams that are collectively or possibly independently directed by the rotatable assemblies 430 and 432 in a manner described in relation to the other embodiments.

The outer rotatable assembly 430 includes an outer body 436 which is cylindrical and tubular in construction. The body 436 includes a Risley end 438 opposite a drive end 440. An outer drive mechanism 442 is associated with the outer rotatable assembly and is connected to the controller 402. As a result, the outer drive mechanism rotates the outer assembly 430 in relation to the housing 401. The Risley end 438 carries an outer Risley steering device 446. The steering device 446 has an outer diameter 448 which is secured to the Risley end 438 and specifically the inner diameter of the Risley end 438. As can be seen in FIG. 11, the outer drive mechanism 442 is axially displaced from the steering device's outer diameter 448. This allows for a minimal outer diameter of the array 400 so as to accommodate any number of sub-apertures as deemed appropriate.

The inner rotatable assembly 432 is configured in much the same manner as the outer rotatable assembly and includes an inner body 450 which has an outer diameter smaller than the inner diameter of the outer body. The inner body 450 is cylindrical and tubular in construction and rotates within the outer body. The inner body 450 includes a Risley end 452 which is opposite a drive end 454. An inner drive mechanism 456 is positioned between the housing 401 and the inner body 450 so as to permit rotation of the inner body as needed. The inner body 450 carries an inner Risley steering device 458 which has an outer diameter 460. The steering device outer diameter 460 is captured within the Risley end 452 and, as such, the steering devices 458 and 446 operate in a manner described in relation to the previous embodiments. In other words, by counter-rotation or same rotation, the beams emitted by the sub-apertures 400 can be collectively or independently directed as dictated by the rotational positioning of the steering devices 446 and 458. The steering devices 446 and 458 may either be in the form of prisms or gratings as discussed in the previous embodiments. If gratings are utilized, then an appropriate electrical connection will be made to the controller 402.

Bearings 462 are disposed between the inner body 450 and outer body 436 to allow rotation counter to one another or with one another as needed. An outer encoder 464 is connected to the controller 402 so as to track and monitor the angular or rotational position of the outer body 436. In a similar manner, an inner encoder 466 is associated with the inner drive mechanism 456 and also to the controller 402 so as to monitor and track the rotational or angular position of the inner body 450.

With this array configuration it will be appreciated that individual beams that are emitted by each sub-aperture can coalesce to a single point by control of the actuators 412 and the rotational positioning of the steering devices 446 and 458. The configuration can also be used to generate a concentrated formation of the points or selected points for each sub-aperture. It will be appreciated that the controller controls both the individual and collective positioning of the light beams through each of the sub-apertures. By utilizing the Risley prisms or Risley gratings with concentric tubes and locating the drive motors and feedback devices in the unused optical spaced axially removed from the prisms or gratings, the modules outer diameter can be minimized relative to the optical aperture. As a result, this embodiment further improves the system fill factor by employing a configuration that provides for multiple small-angle-steerable sub-apertures within a single module envelope. Additionally, wide angle beam steering for the combined sub-apertures is accomplished using either Risley prisms or Risley gratings as described in the previous embodiments. This configuration allows for high fill factor in which multiple beams are steered in approximately the same direction, but allows for small-angle high-beam width tip/tilt correction. Additionally, this configuration maintains fill-factor benefits of the steering module configuration for small aperture beams. Of course, the configuration can also be used for collection of light beams as appropriate.

As best seen in FIG. 13, a large assembly array is designated generally by the numeral 500 which utilizes multiple assemblies 400, all of which are controlled by a master controller 502. Accordingly, each individual sub-aperture can be controlled, and each individual array can be controlled. Accordingly, with appropriate adjustments, all of the sub-aperture beams can be directed to a single point or a collection of desired points. Additionally, with a proper controlling configuration maintained by the controller 502, multiple targets can be tracked and targeted according to the specific type of laser beam being used.

In any of the embodiments shown in FIG. 4, 9, 10, or 11, since the optical components are symmetrical in all directions about a central axis a, rotation of the optical components is not believed to affect the performance of the module. In place of the first, second, and third lenses, other beam expansion optics that serve a similar function could also be used.

In summary, Risley Integrated Steering Modules of the present invention offer several advantages over prior art forms. Given an equal beam size, a RISM module 20, 220, 320 or 400 has a higher fill factor than prior art forms because the thickness t of the outer body portion is less than the thickness of prior art prism rotation assemblies (PRAs). Because of this, an array of modules 20, 220 or 320 has a higher total fill factor than would an array of similarly arranged prior art forms. Also, the disclosed modules include the optical components for expanding and collimating a laser beam as well as the wedge prisms for steering the collimated laser beam, while prior art Risley prism modules merely contain the wedge prisms for steering a laser beam. And, an array of the modules can be constructed in a conformal arrangement, with a window covering the array being supported by a number of posts. The posts reduce the need to use muntins, and therefore increase the potential window size and array size for an array in a conformal arrangement. In addition, an array of modules can be constructed to allow a user to selectively operate each individual module independent from the other modules. Still another advantage of the modules 20, 230, 320, 400 and 500 is that all the disclosed embodiments can be used as a receiver or collection device as well as a transmitter, and if properly configured as a bidirectional transceiver by switching between transmit and receive modes. Appropriate modifications to each respective controller are implemented to enable the transmit, receive or bidirectional modes.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A beam steering device comprising:
    an outer assembly rotatable about an axis by a first motor assembly;
    an inner assembly rotatable about said axis by a second motor assembly and positioned radially within said outer assembly;
    a first steering device connected to said outer assembly; and
    a second steering device connected to said inner assembly, wherein both said first and second motor assemblies are axially displaced from said first and second steering devices.

2. The beam steering device according to claim 1, wherein said first and second steering devices are either Risley prisms or Risley gratings.

3. The beam steering device according to claim 1, further comprising:
    an array of steerable sub-apertures maintained within said inner and outer assemblies.

4. The beam steering device according to claim 3, wherein each said sub-aperture comprises:
    a tip/tilt actuator that receives an optical fiber, wherein aid tip/tilt actuator individually steers a light beam on said optical fiber through said steering device.

5. The beam steering device according to claim 4, further comprising:
    a master controller connected to each said tip/tilt actuator and said first and second motor assemblies to independently and collectively control steering said light beams.

6. The beam steering device according to claim 1, further comprising:
    a stationary assembly having a portion thereof positioned between said outer assembly and said inner assembly.

7. The beam steering device according to claim 6, wherein said first motor is positioned between an inner surface of said outer assembly and said stationary assembly; and
    said second motor is positioned between an outer surface of said inner assembly and said stationary assembly, wherein both said motors have a stator secured to said stationary assembly and both said motors have an outer diameter less than said inner surface of said outer assembly.

8. The beam steering device according to claim 7, further comprising:
    a first position encoder carried by an outer surface of said stationary assembly; and
    a second position encoder carried by an inner surface of said stationary assembly.

9. The beam steering device according to claim 8, further comprising:
    a controller connected to said motors and said encoders so as to control the rotational positions of said outer and inner assemblies with respect to said stationary assembly.

10. The beam steering device according to claim 6, wherein said outer assembly is rotatable about said portion of said stationary assembly, and wherein said inner assembly is rotatable about said portion of said stationary assembly.

11. The beam steering device according to claim 10, further comprising:
    beam expansion optics carried by said inner assembly.

12. The beam steering device according to claim 11, wherein said outer assembly and said inner assembly are connected to said stationary assembly through bearings.

13. The beam steering device according to claim 11, wherein said beam expansion optics include at least one lens for expanding a beam and at least one lens for converging a beam.

14. The beam steering device according to claim 1, further comprising:
    a stationary assembly positioned radially inside said outer assembly and said inner assembly.

15. The beam steering device according to claim 14, further comprising:
    a first motor positioned between an inner surface of said outer assembly and said stationary assembly; and
    a second motor positioned between an inner surface of said inner assembly and said stationary assembly, and both said motors have an outer diameter less than said inner surface of said outer assembly.

16. The beam steering device according to claim 15, further comprising:
    first and second position encoders carried by said stationary assembly;
    a first encoder ring carried by said outer assembly and operative with said first position encoder; and
    a second encoder ring carried by said inner assembly and operative with said second position encoder.

17. The beam steering device according to claim 16, further comprising:
- a controller connected to said motors and said position encoders so as to control the rotational positions of said outer and inner assemblies with respect to said stationary assembly.

18. The beam steering device according to claim 14, wherein said outer assembly and said inner assembly are rotatable about said stationary assembly.

19. The beam steering device according to claim 18, wherein said inner assembly is supported by a pair of inner assembly bearings disposed on either side of said second motor assembly.

20. The beam steering device according to claim 19, further comprising:
- an outer assembly bearing interposed between said outer assembly and said inner assembly, and radially positioned between said pair of inner assembly bearings.

21. The beam steering device according to claim 19, further comprising a first outer assembly bearing interposed between said outer assembly and said inner assembly, and a second outer assembly bearing interposed between said outer assembly and said stationary assembly.

22. The beam steering device according to claim 18, further comprising:
- beam expansion optics carried by said stationary assembly.

23. The beam steering device according to claim 22, wherein said outer assembly and said inner assembly are connected to said stationary assembly through bearings.

24. The beam steering device according to claim 22, wherein said beam expansion optics include at least one lens for expanding a beam and at least one lens for converging a beam.

* * * * *